US012197300B2

(12) United States Patent
Andreina et al.

(10) Patent No.: US 12,197,300 B2
(45) Date of Patent: Jan. 14, 2025

(54) METHOD AND SYSTEM FOR EXECUTION OF A BYZANTINE FAULT TOLERANT PROTOCOL

(71) Applicant: NEC Laboratories Europe GmbH, Heidelberg (DE)

(72) Inventors: Sebastien Andreina, Heidelberg (DE); Ghassan Karame, Bochum (DE)

(73) Assignee: NEC CORPORATION, Tokyo (JP)

( * ) Notice: Subject to any disclaimer, the term of this patent is extended or adjusted under 35 U.S.C. 154(b) by 188 days.

(21) Appl. No.: 18/002,056

(22) PCT Filed: Sep. 29, 2020

(86) PCT No.: PCT/EP2020/077205
§ 371 (c)(1),
(2) Date: Dec. 16, 2022

(87) PCT Pub. No.: WO2021/259511
PCT Pub. Date: Dec. 30, 2021

(65) Prior Publication Data
US 2023/0229569 A1    Jul. 20, 2023

(30) Foreign Application Priority Data
Jun. 25, 2020   (EP) .................................... 20182369

(51) Int. Cl.
*G06F 11/14*     (2006.01)
*H04L 41/0654*   (2022.01)
*H04L 43/08*     (2022.01)

(52) U.S. Cl.
CPC ...... *G06F 11/1474* (2013.01); *H04L 41/0654* (2013.01); *H04L 43/08* (2013.01); *G06F 2201/87* (2013.01)

(58) Field of Classification Search
CPC ............ G06F 11/1474; G06F 2201/87; H04L 41/0654; H04L 43/08
See application file for complete search history.

(56) References Cited

U.S. PATENT DOCUMENTS 6,671,821 B1 * 12/2003 Castro ................. G06F 11/1482
714/21
11,922,074 B1 * 3/2024 Thomason ............ G06F 3/0604
(Continued)

OTHER PUBLICATIONS

Alistarh, Dan et al., "How Efficient Can Gossip Be? (On the Cost of Resilient Information Exchange)," International Colloquium on Automata, Languages, and Programming, Jul. 6, 2010, pp. 115-126, XP019146196, Springer, Berlin, Heidelberg, Germany.
(Continued)

*Primary Examiner* — Matthew M Kim
*Assistant Examiner* — Indranil Chowdhury
(74) *Attorney, Agent, or Firm* — Leydig, Voit & Mayer, Ltd.

(57) ABSTRACT

A method for execution of a Byzantine Fault Tolerant (BFT) protocol among a number of participating nodes of a network includes: receiving, by a primary node of the BFT protocol, a transaction request, applying, by the primary node, a data dissemination protocol for distributing the transaction request among the participating nodes via a data-plane of the network, and generating, by the primary node, a hash of the transaction request and requesting consensus among the participating nodes via a control-plane of the network using the hash of the transaction request.

17 Claims, 2 Drawing Sheets

(56) References Cited

U.S. PATENT DOCUMENTS

| | | | |
|---|---|---|---|
| 2018/0307573 A1* | 10/2018 | Abraham | G06F 11/1479 |
| 2019/0349426 A1* | 11/2019 | Smith | H04W 4/70 |
| 2020/0081805 A1* | 3/2020 | Abraham | H04L 9/3239 |
| 2020/0167243 A1* | 5/2020 | Rauh | H04L 67/1097 |
| 2020/0379856 A1* | 12/2020 | Jayachandran | G06F 16/2365 |
| 2021/0117410 A1* | 4/2021 | Sekniqi | G06F 16/2379 |
| 2023/0130074 A1* | 4/2023 | Xiao | H04L 45/46 |
| | | | 370/389 |

OTHER PUBLICATIONS

Liu, Jian et al., "Scalable Byzantine Consensus via Hardware-assisted Secret Sharing," Dec. 15, 2016, pp. 1-12, Arxiv.Org, Cornell University Library, New York, United States.

* cited by examiner

METHOD AND SYSTEM FOR EXECUTION OF A BYZANTINE FAULT TOLERANT PROTOCOL

CROSS REFERENCE TO RELATED APPLICATIONS

This application is a U.S. National Phase application under 35 U.S.C. § 371 of International Application No. PCT/EP2020/077205, filed on Sep. 29, 2020, and claims benefit to European Patent Application No. EP 20182369.7, filed on Jun. 25, 2020. The International Application was published in English on Dec. 30, 2021 as WO 2021/259511 A1 under PCT Article 21(2).

FIELD

The present invention relates to methods and systems of execution of a Byzantine Fault Tolerant, BFT, protocol among a number of participating nodes of a network.

BACKGROUND

Byzantine Fault Tolerance (BFT) protocols are a family of protocols that aim at achieving consensus between multiple participants that do not trust another, even in case of presence of adversaries. BFT protocols typically achieve provable properties as long as the number of adversaries does not grow above a threshold, e.g. for N participants, up to f participants can be adversaries, with $N \geq 3*f+1$.

BFT protocols have come to light recently for the usage when composed with the Blockchain technology. However, BFTs are protocols known for their lack of performance in terms of throughput and latency as well as their lack of scalability. Indeed, most of the existing BFT protocols require a number of messages that is quadratically proportional to the number of participating nodes. Such protocols, e.g. PBFTs (Practical Byzantine Fault Tolerance), can only achieve agreement up to a few hundreds of KB of data per second when using a quorum of around 10 nodes, which yields a throughput of a few hundred transaction per seconds only, if assuming a transaction size similar to blockchain protocols such as Bitcoin.

SUMMARY

In an embodiment, the present disclosure provides a method for execution of a Byzantine Fault Tolerant (BFT) protocol among a number of participating nodes of a network. The method comprises: receiving, by a primary node of the BFT protocol, a transaction request, applying, by the primary node, a data dissemination protocol for distributing the transaction request among the participating nodes via a data-plane of the network, and generating, by the primary node, a hash of the transaction request and requesting consensus among the participating nodes via a control-plane of the network using the hash of the transaction request.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
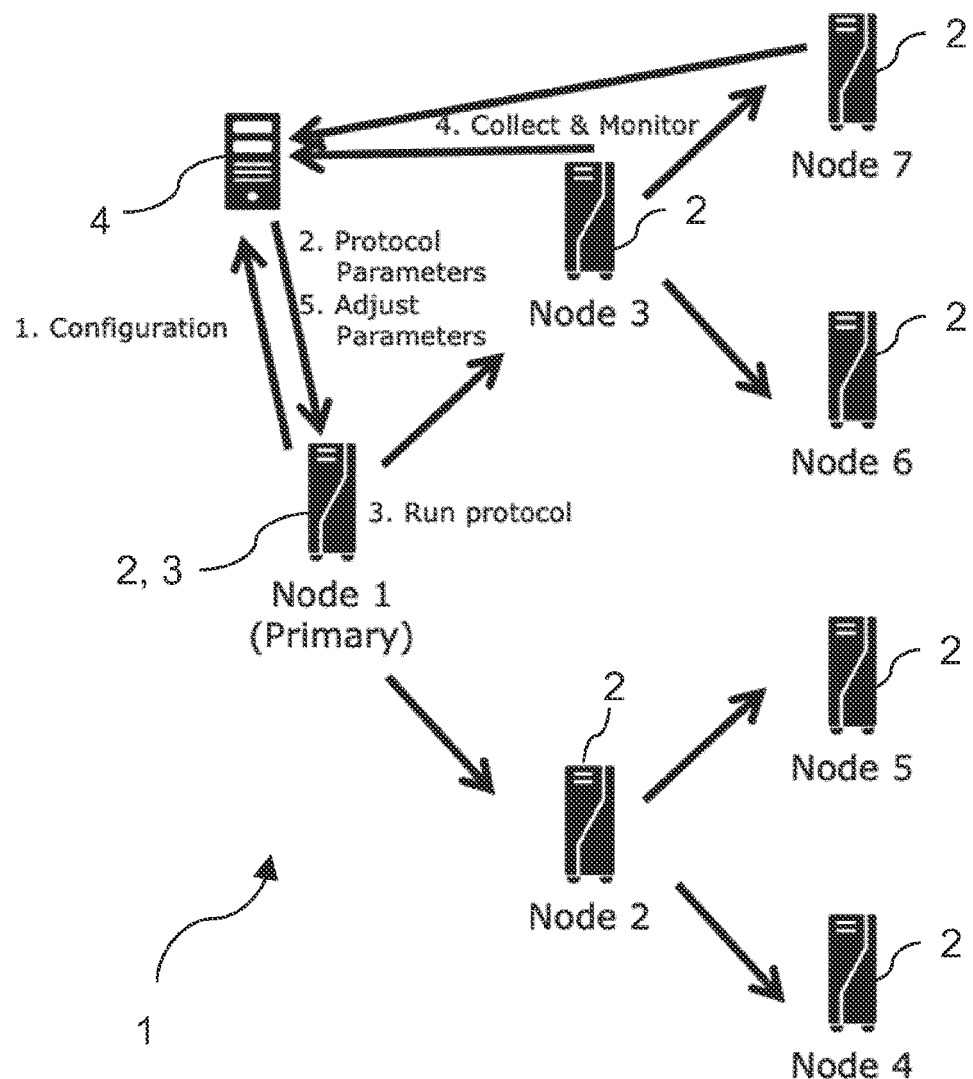
FIG. 1 is a diagram schematically illustrating a topology of a system using a BFT protocol in accordance with an embodiment of the present invention.

In an embodiment, present invention improves and further develops a method and a system of execution of a Byzantine Fault Tolerant, BFT, protocol in such a way that the performance in terms of throughput and/or latency is improved.

In another embodiment, the present invention provides a method of execution of a Byzantine Fault Tolerant, BFT, protocol among a number of participating nodes of a network, wherein the method comprises receiving, by a primary node of the BFT protocol, a transaction request; applying, by the primary node, a data dissemination protocol for distributing the transaction request among the participating nodes via a data-plane of the network; and generating, by the primary node, a hash of the transaction request and requesting consensus among the participating nodes via a control-plane of the network using the hash of the transaction request.

In another embodiment, the present invention provides a system for execution of a Byzantine Fault Tolerant, BFT, protocol in a network, the system comprising a number of nodes participating in the BFT protocol, wherein the number of participating nodes includes a primary node of the BFT protocol that is configured to receive a transaction request; apply a data dissemination protocol for distributing the transaction request among the participating nodes via a data-plane of the network; generate a hash of the transaction request; and request consensus among the participating nodes via a control-plane of the network using only the hash of the transaction request.

According to the invention it has been recognized that performance improvements of the BFT protocol can be achieved by reducing the message size of the BFT algorithm. Furthermore, it has been recognized that a reduction of the message size of the BFT algorithm can be effectively achieved by decoupling the control-plane (the actual consensus layer) from the data-plane (the transactions). Consequently, embodiments of the present invention introduce a general optimization to BFT algorithms by decoupling the data from the actual protocol thereby improving BFT protocol performance and scalability. In particular, by way of combining the proposed decoupling with using Fastest Node First (FNF) as data dissemination protocol at the data-plane a very low latency (and scalable) BFT algorithm can be achieved.

According to embodiments of the invention the data of a transaction request will be shared through some optimized data dissemination algorithm, while the BFT algorithm would run consensus on the hash of the data only, effectively reducing the message size of the consensus algorithm. As long as all the different nodes participating in the consensus algorithm receive the data from the data-plane, the control-plane can reach consensus on this data. The control-plane does not need to offer any form of guarantee, as best effort broadcast suffices, and therefore can use simpler protocols such as gossip protocols or data dissemination protocols, in order to optimize the throughput. Hereinafter, the terms 'gossip protocols' and 'data dissemination protocols' will be used synonymously.

According to embodiments of the invention, the method may be executed as follows: Upon starting the BFT protocol (with the integrated optimization of separating the data-plane from the control-plane in the BFT network), network statistics and an optimization configuration may be provided to the data dissemination layer. In such embodiments, a topology component implemented at the data-plane may be used that, given the network statistics and the optimization configuration, selects the best protocol to use for data dissemination, together with the selected protocol's operation parameters. Once a participating node acting as primary node of the BFT protocol receives a transaction request, the primary node sends the request through the data-plane layer (using the selected data dissemination protocol), while it requests consensus using only the hash of the transaction request. The peers of the BFT protocol receive the consensus request and wait to receive the transaction request (i.e. the data) through the data-plane layer before replying to it. As in the conventional BFT protocols, the primary terminates the consensus request if enough nodes agreed with it.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

BFT protocols are very interesting protocols to be used in distributed settings thanks to the strong guarantees they provide. The two main guarantees of a BFT protocol are safety and liveliness. Safety means that if a correct node of a distributed setting decides on a value x, all the correct nodes of the setting will eventually decide on this value. Furthermore, this value x has been proposed by a correct client. Correct clients further agree on values in the exact same order. On the other hand, liveliness means that if a correct client issues a request x, the BFT protocol will eventually agree on this request x.

Those two properties are guaranteed as long as the number of byzantine nodes (i.e. nodes behaving faulty or malicious) does not grow above the threshold defined by the protocol. Typical protocols can support up to f byzantine nodes, when the quorum consists of a total of N nodes, with N≥3f+1. Protocols using some additional trust (such as trusted hardware, e.g. implemented in form of a Trusted Execution Environment, TEE) can further reduce the bound to a number of N faulty nodes, with N≥2f+1.

Thanks to those properties, BFT protocols can be used when multiple parties want to collaborate but do not necessarily trust each other fully. The guarantees provided by the BFT protocol ensure that as long as no group of more than f malicious node collude, they will not be able to lie or change the output of the protocol.

Owing to the potential presence of adversaries, BFT protocols require lots of messages and often achieve a message complexity of $O(n^2)$, and are therefore not scalable. Embodiments of the present invention reduce the size of the messages exchanged in the protocol, by effectively removing the payload from the BFT messages, and sharing it through a data dissemination protocol that provides weaker properties. Therefore, in accordance with these embodiments, the messages subject to the $O(n^2)$ complexity can be drastically reduced in size, and the payload can be shared through a simple data dissemination protocol with complexity $O(n)$.

According to an embodiment it is assumed that a quorum is interested in running a BFT protocol to order transactions and that their aim is to maximize throughput while minimizing latency. Without loss of generality, it can be further assumed that the protocol can have an "Optimistic" mode and a "Fallback" mode, wherein the optimistic mode assumes a best case scenario where nodes are honest, and the fallback mode assumes that any node may fail or become malicious. The BFT protocol may be configured to automatically switch from optimistic to fallback when too many errors arise, and from fallback to optimistic when the protocol could not detect errors for a while.

Embodiments of the invention introduce a general optimization to BFT algorithms by decoupling the data from the actual protocol. The data can then be shared through some optimized data dissemination algorithm, while the BFT algorithm would run consensus on the hash of the data only, effectively reducing the message size of the consensus algorithm.

Reducing the size of the messages of the consensus algorithm reduces the payload of the messages that might be subject to a $O(n^2)$ complexity. Even for BFT protocol using a$O(n)$ message complexity, it is often for one node to do a 1-to-N broadcast with a message that contain the full request. Removing the request from this message effectively improves the performance of the 1-to-N broadcast since it uses much smaller messages. Typically, BFT control messages would be around 100 bytes, while request can be from few KB up to a few MB. Since the request is propagated through a gossip protocol, it would reduce the strain on the node performing the 1-to-N broadcast.

Basically, the method according to the present invention can be applied to any system using a BFT protocol. To quote just one example, by using embodiments of the present invention, according to which the data is decoupled from the actual consensus messages, it would be possible to improve the BFT protocol of a Key-Value Data Store in the cloud, for instance.

According to embodiments of the invention different gossip protocol may be used for the data-plane. Furthermore, each of the different gossip protocols may be used with different levels of strength (in terms of resilience), as will be explained in more detail hereinafter. In the terminology used herein, the node that receives the data, e.g. through a "Broadcast" request, will be denoted "primary" node. According to embodiments, resilience may be added on top of any of those protocol by adding some "inv" message that could be broadcast to all participating nodes (for reference see, e.g.: https://en.bitcoin.it/wiki/Protocol_documentation). An inv message may be designed to contain only the $H_{data}$, and therefore be extremely small (around 40 bytes). This inv message could be used to advertise the availability of a node to serve the data. According to embodiment it may be provided that, upon reception of an inv message, a node could start a timer. If at the end of this timer, the data corresponding to the inv message has still not been received through the normal gossip protocol currently used, the node may time out and request the data from a peer that advertised an inv message.

The following data dissemination protocols may be selected to be used as the gossip protocol for the data-plane. As will be appreciated by those skilled in the art, the following list is not exhaustive and other protocols not explicitly mentioned hereinafter may be implemented likewise, depending on the specific application scenario.

FNF: Fastest Node First (FNF) is a data dissemination algorithm where nodes continuously upload a request to the node with the highest bandwidth/lowest latency they know of. The upload order is decided in the configuration by using some statistic of the network, and assuming the network state does not change too much. FNF is useful to minimize the latency to execute one request.

X-aryTree: According to this protocol nodes are ordered in a balanced tree where each non-leaf node has up to X children. The primary node sits at the root of the tree and broadcasts transactions through its children. If requests are chained, X-aryTree achieves a tradeoff between throughput and latency. If X is equal to 2, this creates a standard well known Binary Tree.

X-Trees: In X-trees, all the nodes (except the primary) are setup in X X-ary trees where each node is exactly once a non-leaf node. Upon reception of requests, the primary broadcasts one request through each X-ary tree. This optimization of X-aryTree comes from the observation that in a X-aryTree, the leaf nodes never use their upload bandwidth to send data to anyone. By creating multiple X-aryTree where each node is exactly once a non-leaf node, the protocol can optimize the resource usage from the different nodes. In X-Trees, each node has to upload data once every X request to X children.

Redundant Mesh: The redundant mesh is based on an X-aryTree, except that nodes have potentially multiple parents. This mesh is useful to add redundancy by default instead of having to wait for nodes to timeout and request the data from some received inv.

MultiCast: The multicast function of the ip layer could further be used to perform multicast from 1-to-N directly, effectively reducing the load on all the nodes, as this step would require only one node to upload the data once. Multicast is however only available in LAN or in setup where the consortium of nodes has full control of the switches and routers. Since it is often not the case in WAN, this option is limited to very few cases.

According to an embodiment it may be provided that the data-plane implements two or more of the previously mentioned algorithms (or even all of them) in order to provide flexibility to the BFT protocol. The primary node may then select one of the implemented protocols to be used, depending on the application scenario and the relevant conditions.

FIG. 1 illustrates an embodiment of the present invention, assuming a certain network topology 1 as shown including a number of network nodes 2 (Node1, . . . , Node7) wherein Node 1 is assumed to act as primary node 3. In the illustrated embodiment, the system includes a topology aware component 4 implemented at the data-plane, which has knowledge of the current network topology. The topology aware component 4 is configured to select which of the data dissemination protocols should be run as well as the protocol's configuration. The selection of the data dissemination protocol to be used may be based on statistics on the network, such as the throughput and the latency between each two nodes 2, and based on an optimization parameter, e.g. minimize latency, maximize throughput, or a well-defined combination of two or more optimization parameters.

According to an embodiment the topology aware component 4 may be configured to also integrate a feedback loop that is designed to compare the expected network statistics, in particular latency and throughput, versus the actual values. The outcome of this comparison may be used to adjust the network. The feedback loop would help address network changes, as it could detect sudden network slowdown from some peers, and effectively restructure the network. For instance, restructuring the network may include removing pushing nodes 2 that are excessively slow to leaves of the tree.

According to an embodiment the topology aware component 4 may be used as depicted in FIG. 1. As shown at 1., in a first step the topology aware component 4 is preconfigured, i.e. the topology aware component 4 is given some configuration, including the network statistics and some parameter, such as which metric to optimize (e.g. latency minimization, throughput maximization or the like) and the degree of resilience required.

Based on its configuration received, the topology aware component 4 performs some simulations to decide which gossip protocol to. The protocol name of the resulting gossip protocol well as the parameters of the protocol to use are then communicated within the network, for instance directly to primary node 3, as indicated at step 2.

As shown at step 3., based on the information received from the topology component 4 the nodes 2 can start the gossip protocol using the defined parameters.

As shown at step 4., the topology component 4 may be further configured to periodically collect feedback from the different nodes 2 and to monitor the performance to detect network changes. In case the topology component 4 detects an issue, e.g. a discrepancy (exceeding a preconfigured threshold) between expected and achieved throughput, it may issue respective update messages to either adapt the configuration parameters of the data dissemination protocol currently in use or to propose the usage of a different data dissemination protocol that better satisfies the optimization metric given the detected network changes.

While the topology aware component 4 depicted in the embodiment of FIG. 1 is a discrete entity, it should be noted that according to an alternative embodiment the topology aware component 4 can be simply integrated in the data dissemination client of all the peers/nodes 2. Furthermore, it should be noted that in case of using a centralized third party as the topology component 4, this does not create any security risk as the topology component 4 only impacts on the performance. If the performance is not satisfactory, it is expected that the topology component 4 would be changed/removed.

According to embodiments of the invention, several dedicated application programming interfaces, APIs, which support the decoupling, may be newly created and introduced at the data-plane. Before detailing these newly created APIs, the high level APIs of a standard BFT algorithm will be briefly described. For better understanding, but without loss of generality, in this description the APIs of the BFT protocol will be simplified to the functions needed by a BFT protocol integrated within a blockchain. However, as will be appreciated by those skilled in the art, a standard BFT protocol could further hold a key-value store to issue read/write requests, as well as rules of validity for those requests, etc.

Conventionally, a standard BFT protocol displays two main API functions, as follows:

Broadcast<Tx>: This API is designed to be used by a client to issue a broadcast request for a transaction Tx. The consensus algorithm will then run to agree on the order of this Tx Deliver<Tx, $\pi_{Tx}$>: This API is designed to be used by the nodes of the protocol to deliver, upon agreement reached, the transaction Tx to all the clients, as well as a proof $\pi_{Tx}$ that consensus has been reached on this transaction Tx.

According to embodiments of the present invention, the data-plane may be configured to expose one or more of the following APIs:

Broadcast<data>: This API is designed to be used by a node to broadcast the data (of a transaction request) a using the underlying gossip protocol.

Subscribe<$H_{data}$, callback>: This API is designed to be used by a node to trigger the callback upon reception of the data matching $H_{data}$ (wherein $H_{data}$ denotes the hash value of the data).

FetchData<H data>: This API is designed to be used by a node to actively request the data matching $H_{data}$ from other nodes.

SetConfiguration<config>: This API is designed to be used configure the gossip protocol (e.g. optimize latency vs throughput, select resilience degree, select timeouts, etc.).

As already mentioned above, according to an embodiment the topology aware component 4 may be configured to select, from a pre-implemented pool of different data dissemination products, one protocol to be applied for data dissemination among the participating nodes 2 of the BFT protocol. in such embodiments, the topology component 4 may take as input one parameter to optimize, possibly together with a resiliency level, in addition to the network statistics. The parameter to optimize can be, for instance, resiliency, latency, or throughput.

The topology aware component 4 may be configured to apply some rules to decide which data dissemination algorithm to choose. For instance, the following rules may be defined for the respective optimization parameters:

Resiliency: It may be provided that his parameter should be selected when facing a network that is unstable and containing potentially many adversaries. In this case, the mesh network should be preferred as it provides a default degree of resilience on top of the inv messages. This reduces the latency variation. According to an embodiment this data dissemination protocol (denoted 'redundant mesh' protocol the protocol listing given above) may be predominantly used when the BFT algorithm switches from an optimistic mode to a fallback mode.

Latency: If the BFT layer does not work under heavy load, but consensus on each request should be reached with lowest possible latency, then the fnf network should be preferred, as it is optimized for such a use case. It should be noted that in this case, the latency is optimized at the cost of the throughput, since transactions cannot be chained as easily.

Throughput: When optimizing for throughput, the network of choice should always be a tree based topology, such as X-Trees. X-Trees maximize the throughput of the network by using the resource of all the nodes at the same time and chaining requests by sending them through different trees.

It should be noted that for each of the previously mentioned cases, it is further possible to add a degree of resilience through the "inv" messages. In this context, a degree of 2 means that in addition of receiving the request from its parent, each node will receive an "inv" from another (non-parent) node. A degree of resilience of T helps against up to T−1 adversaries in the tree. As the inv messages are very cheap and do not incur any meaningful delay, it is suggested to have a degree of resilience of around f most of the time, wherein f denotes the number of tolerable adversaries according to the relation N≥3*f+1 (wherein N denotes the number of participating nodes).

The performance improvement when applying the optimization depends on the setup and on the implementation of the BFT protocol. For the following explanations of the performance gains, a standard (albeit small) setup for blockchain will be assumed, including a number of 20 nodes, transactions (blockchain blocks) of size 1 MB and a BFT protocol messages size of 100 Bytes.

PBFT is typically a BFT protocol that requires a number of message in the order of $O(n^2)$. The clients first need to send the request to all the N nodes, then the nodes all broadcast the full request in a "Prepare" messages, and finally the node broadcast again a "Commit" message before returning the result to the client. Here the amount of data that a node has to upload to other nodes is: N*(Transaction size+Message size), so each node needs to upload at least 20 MB of data, only for the prepare message.

Considering a simple binary tree topology, the amount of data required to be uploaded by non-leaf nodes is 2 MB, and the data by leaf nodes is only the protocol messages N*100 bytes=2 KB. This consists in a 90% reduction in message upload for non-leaf trees and a 99.99% message upload reduction for leaf nodes. If one further uses a 2-Trees with 2 binary trees, this would result in a 95% reduction of data consumption on average for all the nodes.

Figure 2:
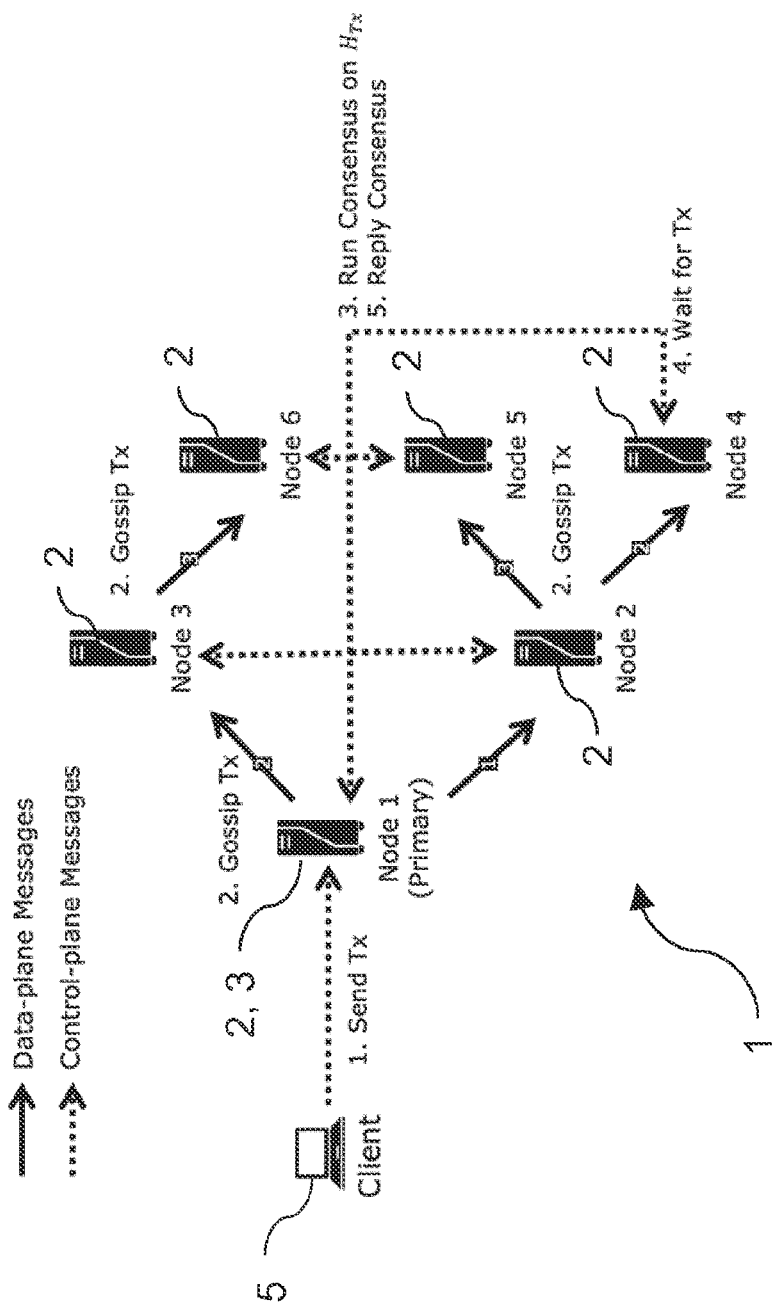
FIG. 2 is a diagram schematically illustrating a flow of a transaction when using FNF for the data-plane in accordance with an embodiment of the present invention.

FIG. 2 schematically illustrates a flow of a transaction when using FNF for the data-plane in accordance with an embodiment of the present invention. In FIG. 2, data-plane messages are generally indicated by solid line arrows, while control-plane messages are indicated by dotted line arrows. Like reference numerals denote like components as in FIG. 1.

As is shown at step 1., the BFT protocol is initiated by a client 5 sending a transaction request Tx towards the network 1. The request is received by Node 1 that acts as primary node 3 and first calls the broadcast API of the data-plane protocol (see step 2. in FIG. 2). In the illustrated example, it is assumed that the FNF (Fastest Node First) data dissemination algorithm is selected to be applied.

At the same time, as is shown at step 3., the primary 3 starts a consensus on the hash of the request $H_{Tx}$ using the Broadcast API of the BFT protocol. Depending on the BFT protocol, this request can be directly broadcasted from the primary 3 to each node 2, or further use a different scheme.

As is shown at step 4., for each node 2, upon reception of the BFT request on $H_{Tx}$, the nodes 2 wait to receive $H_{Tx}$ by subscribing to it, using the subscribe<$H_{Tx}$> API of the data-plane API.

As is shown at step 5., upon reception of the Tx from the data-plane, the nodes 2 can continue to run the BFT protocol and process the consensus message.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of execution of a Byzantine Fault Tolerant (BFT) protocol among a number of participating nodes of a network, the method comprising:
   receiving, by a primary node of the BFT protocol, a transaction request,
   applying, by the primary node, a data dissemination protocol for distributing the transaction request among the participating nodes via a data-plane of the network, and
   generating, by the primary node, a hash of the transaction request and requesting consensus among the participating nodes via a control-plane of the network using the hash of the transaction request.

2. The method according to claim 1, wherein a number of different data dissemination protocols are pre-implemented at the data-plane, the method further comprising:
   selecting, from the number of pre-implemented data dissemination protocols, a data dissemination protocol to be applied by the primary node for distributing the transaction request among the participating nodes.

3. The method according to claim 2, wherein the pre-implemented data dissemination protocols include a Fastest Node First (FNF), data dissemination protocol, an X-ary Tree data dissemination protocol, an X-Trees data dissemination protocol, a redundant mesh data dissemination protocol, and/or a multicast data dissemination protocol.

4. The method according to claim 1, further comprising:
   providing, by a network topology aware component implemented at the data-plane, network statistics and/or network configuration information,
   wherein selecting the data dissemination protocol to be applied for distributing the transaction request among the participating nodes is based on the provided network statistics and/or network configuration information.

5. The method according to claim 1, further comprising:
   monitoring, by a network topology aware component, network performance by collecting feedback information from the participating nodes, and
   in case of detecting a change in network performance exceeding a predefined threshold, issues an update message to adapt the data dissemination protocol to be applied for distributing the transaction request among the participating nodes.

6. The method according to claim 5, wherein the network performance comprises latency and/or throughput.

7. The method according to claim 1, wherein the data dissemination protocol includes a resilience enhancing mechanism, wherein the mechanism includes broadcasting of inv messages that advertise availability of a node in the network to serve the transaction request.

8. The method according to claim 1, wherein the data-plane exposes a broadcast application programming interface (API) for broadcasting data using the applicable data dissemination protocol.

9. The method according to claim 1, wherein the data-plane exposes a subscription API that is configured to enable participating nodes, upon reception of a BFT request on the transaction request, to wait to receive the hash of the transaction request by subscribing to the transaction request.

10. The method according to claim 1, wherein the BFT protocol comprises an optimistic execution mode and a fallback execution mode, wherein the optimistic execution mode assumes a best case scenario where the participating nodes are honest, and wherein the fallback execution mode assumes that any participating node—may fail or become malicious, the method comprising:
    switching from optimistic to fallback execution mode when a number of errors exceeds a configurable threshold, and switching from fallback to optimistic execution mode when no errors are detected for a configurable time period.

11. A network node, configured to act as primary node of a Byzantine Fault Tolerant (BFT) protocol in a method according to claim 1.

12. A system for execution of a Byzantine Fault Tolerant (BFT) protocol in a network, the system comprising a number of nodes participating in the BFT protocol, wherein the number of participating nodes includes a primary node of the BFT protocol that is configured to:
    receive a transaction request,
    apply a data dissemination protocol for distributing the transaction request among the participating nodes via a data-plane of the network,
    generate a hash of the transaction request, and
    request consensus among the participating nodes via a control-plane of the network using only the hash of the transaction request.

13. The system according to claim 12, further comprising a network topology aware component implemented at the data-plane of the network and configured:
    to receive network statistics related to at least one of throughput and latency between each pair of participating nodes,
    to receive configuration settings including an optimization parameter that indicates a metric to be optimized, and
    based on the network statistics and the configuration settings, select a particular data dissemination protocol to be applied for distributing the transaction request among the participating nodes.

14. The system according to claim 13, wherein the network topology aware component is configured to
    monitor network performance by collecting feedback information from the participating nodes, and
    in case of detecting a change in network performance exceeding a predefined threshold, issue an update message to adapt the data dissemination protocol to be applied for distributing the transaction request among the participating nodes.

15. The system according to claim 14, wherein the network performance comprises latency and/or throughput.

16. The system according to claim 12, wherein the data-plane exposes a broadcast application programming interface (API) for broadcasting data using the applicable data dissemination protocol.

17. The system according to claim 12, wherein the data-plane exposes a subscription API that is configured to enable participating nodes, upon reception of a BFT request on the transaction request, to wait to receive the hash of the transaction request by subscribing to the transaction request.

* * * * *